United States Patent Office 3,189,431
Patented June 15, 1965

3,189,431
METHOD FOR THE CONTROL OF UNDESIRABLE PLANT GROWTH
Paul L. Salzberg, Wilmington, Del., assignor to E. I. du Pont de Nemours and Company, Wilmington, Del., a corporation of Delaware
No Drawing. Filed Sept. 15, 1960, Ser. No. 56,115
1 Claim. (Cl. 71—2.6)

This application is a continuation-in-part of copending application Serial No. 619,088 filed October 29, 1956, and now abandoned.

This invention relates to herbicidal compositions and methods employing certain substituted biurets.

It is recognized in the literature that biuret is not an effective herbicide, even when applied at excessive rates. For example, DeFrance, Bell and Odland in the Journal of the American Society of Agronomy, vol. 39, 1947, on page 532, report that tests using even an over-application of the known fertilizer biuret proved that biuret did not give good control of weeds. The correctness of the conclusion has been substantiated by negative results obtained in herbicidal evaluation tests carried out by my co-workers.

It is therefore surprising that, according to the present invention, a narrow class of certain substituted biuret compounds has been found to possess outstanding effectiveness as herbicides.

It is particularly unexpected that, in addition to a high order of herbicidal activity on a wide variety of undesirable plant life, the substituted biurets within the scope of the present invention have proven to be extremely effective as pre-emergence herbicides.

Furthermore, compounds within this invention have been found to be characterized by an entirely different type of activity from that possessed by related compounds. The narrow class of biurets described below surprisingly are effective herbicides upon foliar contact application. Additionally, an unusual ability of these compounds to translocate within the plant has been noted.

The substituted biurets employed in the herbicidal compositions and methods of the present invention are those represented by the following formula:

(1) 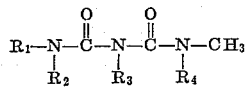

where $R_1$ and $R_3$ are hydrogen, methyl or a monovalent aryl radical represented by:

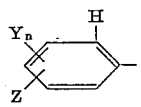

where Y is hydrogen or halogen, $n$ is 1, 2 or 3, and Z is hydrogen, nitro, or alkyl of 1 through 4 carbon atoms, with the proviso that one but only one of $R_1$ and $R_3$ is aryl; and $R_2$ and $R_4$ can be the same or different and are hydrogen or methyl.

It can be seen that these compounds include the following two subclasses:

(2) 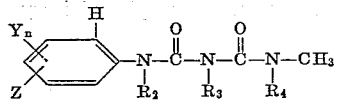

where $R_2$, $R_3$ and $R_4$ can be the same or different and are hydrogen or methyl, and Y, $n$ and Z have the same significance as above; and (3) 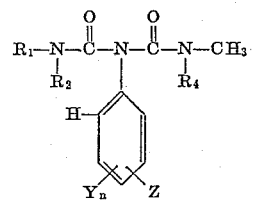

where $R_1$, $R_2$ and $R_4$ can be the same or different and are hydrogen or methyl, and Y, $n$ and Z have the same significance as above.

Preferred compounds are 1,3-dimethyl-5-phenyl biuret and 1,1,5,5 - tetramethyl - 3-(3,4-dichlorophenyl) biuret which are particularly outstanding in their ability to translocate downwardly in plants sufficiently to destroy deep-rooted weeds when applied as a foliar spray. This, of course, makes these compounds ideally suited for use in controlling these difficult to kill weeds.

The substituted biurets employed in the practice of this invention can be prepared by various methods. For example, they can be prepared by the reaction of properly substituted aromatic or aliphatic isocyanates with aliphatic or aromatic ureas, in accordance with the following equations:

(4) 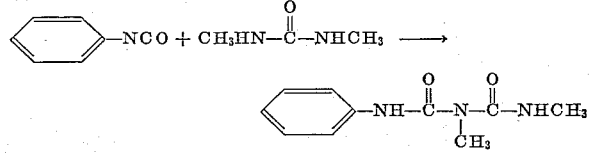

(5) 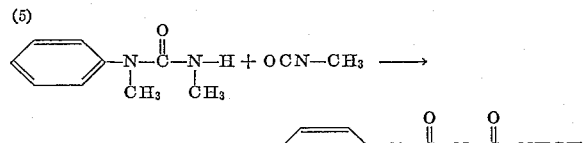

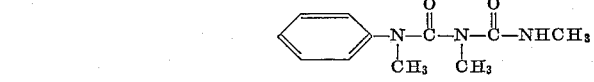

Another method for preparing these compounds is to react a sodium salt of a substituted urea with a carbamyl or carbanilyl chloride to give the substituted biurets of this invention, in accordance with the following illustrative equations:

(6) 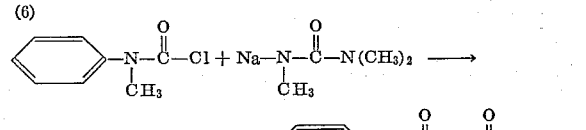

(7) 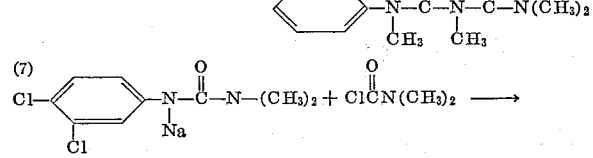

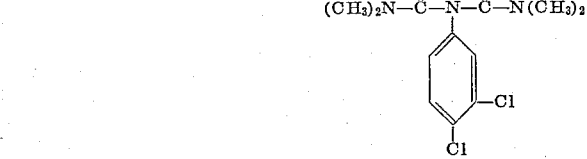

Also, the method of T. L. Davis and N. D. Costan, J. Am. Chem. Soc. 58, 1803 (1936), can be used, as follows:

(8)
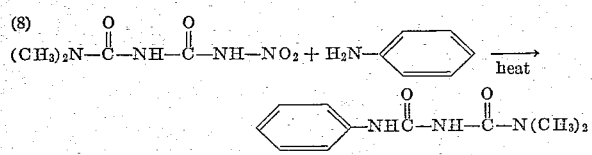

It is to be understood that these equations are for purposes of illustration only, and that by the proper choice of reactants the various other substituted biurets can be prepared.

More complete details concerning the chemistry of biurets are given in a recent article "Biurets and Related Compounds," by Frederick Kurzer in "Chemical Reviews," vol. 56, 95–187 (1956).

The compounds as above described can be volatilized and applied as fogs to the locus or area to be protected or directly to vegetation which is to be killed, or they can be very finely divided and applied as dusts. However, for all practical purposes it will be preferred that the compounds be formulated by admixture with suitable "pest control adjuvants" to provide compositions in the form of solutions, dusts, water dispersible powders, and aqueous dispersions or emulsions.

The herbicidal compositions of the invention are prepared by admixing one or more of the biurets of the invention defined heretofore, in herbicidally effective amounts, with a conditioning agent of the kind used and referred to in the art as a "pest control adjuvant" or "modifier" in order to provide formulations adapted for ready and efficient application to soil or weeds (i.e., undesirable plant growth) using conventional applicator equipment.

By the term "pest control adjuvant," I mean a substance which is capable of presenting and aiding in the presentation of an active compound to the pest, in this case, the undesirable plants. The term "adjuvant" is well established in the art where it is recognized that an active agent or toxicant is in itself of little practical utility for combatting pests unless it is presented in the form suitable for effecting intimate contact of the agent with the pest. Thus additional material or materials are employed in the formulation of an active agent to yield a suitable pest control composition, such materials being adjuvants. Such materials are also sometimes called conditioning agents since they are materials which are added to the active ingredient to assist in bringing it into a condition suitable for application.

Pest control adjuvants such as the dusts, solvents, wetting, dispersing and emulsifying agents set out, for example, in Searle U.S. Patent No. 2,426,417, Todd U.S. Patent No. 2,655,447 or Jones U.S. Patent No. 2,412,510 or in Lenher et al. U.S. Patent No. 2,139,276 can be used. A detailed list of such agents is set forth in an article in "Soap and Chemical Specialties," vol. 31, No. 7, pages 50–61, No. 8, pages 48–61; No. 9, pps. 52–67 and No. 10, pages 38–67 (1955). See also McCutcheon in "Chemical Industries," November 1947, page 8011, entitled "Synthetic Detergents;" and Bulletin E–607 of the Bureau of Entomology and Plant Quarantine of the U.S. Dept. of Agriculture.

Dust compositions of the invention contain one of the biurets of the invention in admixture with a finely divided carrier or dust such as talc, pyrophyllite, natural clays, diatomaceous earths, and other powdered diluents such as those set out in the aforementioned U.S. patent.

Water dispersible powders of the invention can be prepared by admixing one or more of the compounds of the invention with one or more surface-active dispersing and wetting agents and a finely divided solid carrier or dust such as those mentioned heretofore, the surface-active agents being used in amounts sufficient to impart water dispersibility to the powder.

The content of the active compound or compounds of the invention in the pest control compositions will vary according to the manner in which and the purpose for which the composition is to be applied but, in general, will be from 0.5 to 95% by weight of the composition.

Water dispersible liquid compositions can be prepared by incorporating with the substituted biurets and surface-active dispersing, wetting and emulsifying agents various organic liquids such as furfural, methanol, ispropanol, isobutanol, xylol, cresol, cyclohexanol, acetone, methyl-ethylketone, kerosene, trichloroethylene, dimethylformamide, dimethylacetamide, alkylated naphthalenes, and the like.

Granule or pellet compositions can be prepared by mixing the active material in finely divided form with clays (with or without water soluble binders), moistening the mixture with 15–20% water, extruding the mass under pressure through an orifice, then cutting the extrusions to size before drying to yield pellets or first drying, then granulating to yield granules. Alternatively granules, but usually not pellets, can be made by spraying active material in solution or suspension upon the surface of a preformed granule of clay, vermiculite, or other suitable granular material. When the active material is soluble in the spray medium so it can penetrate into the pores of the granular carrier no binding agent is needed. When it is insoluble and in suspension form, a binder is needed to adhere the active material to the surface. The binder can be soluble such as goulac, or destrin or colloidally soluble such as swollen starch, glue or polyvinyl alcohol. The final step in either case is to remove the liquid medium, whether solvent or carrier.

The herbicidal compositions are applied either as a spray or a dust to the locus or area to be protected from undesirable plant growth, commonly called weeds, i.e., plants growing where they are not wanted. Such application can be made directly upon the locus or area and the weeds thereon during the period of weed infestation in order to destroy the weeds or alternatively the application can be made in advance of an anticipated weed infestation to prevent such infestation. Thus, the compositions can be applied as aqueous foliar sprays but can also be applied as sprays directly to the surface of the soil. Alternatively, the dried powdered compositions can be dusted directly on the plants or on the soil. For some purposes as in the treatment on ponds and lake bottoms, it will be convenient to use a pellet form of the composition.

The active ingredients are, of course, applied in amount sufficient to exert the desired herbicidal action. The amount of herbicidally active compounds present in the compositions that are actually applied for destroying or preventing weeds will vary with the herbicidal activity of the active ingredients, the purpose for which the application is being made (i.e., whether for short term or long term control), the manner of application, the particular weeds for which control is sought, and like variables. In general, the herbicidal compositions as applied in the form of a spray or a dust will contain from about 0.02% to 95% by weight of the herbicidally active ingredient.

In order that the invention may be better understood, the following examples are given in addition to the examples already given above:

*Example 1*

A stirring solution of 300 parts by weight of dry xylene containing 88 parts by weight of 1,3-dimethylurea is gradually diluted with 300 parts by weight of xylene containing 119 parts by weight of phenyl isocyanate at reflux temperature. The entire mixture is stirred and heated at reflux for 3 hours. Essentially pure 1,3-dimethyl-5-phenyl biuret crystallizes out of solution on cooling the reaction to room temperature.

This substituted biuret is formulated into the following wettable powder herbicidal compositions by intimately mixing the listed ingredients using conventional mixing or blending equipment, and then grinding the mixture to give a powder having an average particle size less than about 50 microns:

| | Percent |
|---|---|
| 1,3-dimethyl-5-phenyl biuret | 80 |
| Alkyl naphthalene sulfonic acid, sodium salt | 1.5 |
| Methyl cellulose, low viscosity | 0.25 |
| Attapulgite clay | 18.25 |

This wettable powder, when extended with water to form an aqueous sprayable formulation containing 1% by weight of the active ingredient and sprayed upon a railroad embankment infested with a wide variety of both annual and perennial broad-leaf and grassy weeds, such as quackgrass, crabgrass, foxtail, cheat, black-eyed Susan, horseweed, velvet leaf, pigweed, chickweed, lamb's-quarters, as well as seedling woody brush species, at a dosage of 20–30 pounds of the active ingredient per acre, gives excellent weed control.

*Examples 2 thru 15*

The following biurets are prepared in accordance with the procedure of Example 1 by substituting molecular equivalent amounts of the isocyanates and ureas listed below for the phenyl isocyanate and 1,3-dimethylurea employed in Example 1.

These biurets, when employed in wettable powder herbicidal compositions in place of the biuret used in the composition of Example 1, and applied to weed infested areas in accordance with the herbicidal method of Example 1, give excellent weed control.

*Example 16*

A total of 164 parts by weight of 1,3-dimethyl-1-phenyl urea is combined with 57 parts by weight of methyl isocyanate contained in 500 parts by weight of dry nitrobenzene. The entire mixture is heated at reflux temperature with stirring for 3 hours, then stripped free of nitrobenzene by distillation under reduced pressure. Recrystallization of the crude residue from ethyl acetate gave essentially pure 1,3,5-trimethyl-1-phenyl biuret.

This substituted biuret is formulated into the following herbicidal composition by blending and micropulverizing, then moistening with water and moist granulating.

| | Percent |
|---|---|
| 1,3,5-trimethyl-1-phenyl biuret | 25 |
| Alkyl naphthalene sulfonic acid, sodium salt | 1 |
| Attapulgite clay | 74 |

The product is dried and screened to yield 6–15 mesh granules.

These granules are applied at the rate of one tablespoon on the ground to cover an area one-half to one square foot at the base of each brush cluster. This treatment gives excellent control of such brush species as birch, box elder, oak, sweet gum, maple, locust and hickory.

When this formulated product is applied at the rate of 30 pounds of active ingredient per acre to an 18-inch band under a cyclone fence, excellent control of broadleaf and grass weeds is obtained.

*Example 17*

1,1,5-trimethyl-3-phenyl biuret is prepared in accordance with the procedure of Example 16 by using in place of the 1,3-dimethyl-1-phenyl urea the same amount of 1,1-dimethyl-3-phenyl biuret. When used in accordance with the procedures of that example, it gives excellent control of weeds in an infested area.

*Example 18*

Anhydrous trimethyl urea (74 parts by weight) contained in 500 parts by weight of dry toluene is combined with 54 parts by weight of sodium methoxide. The mixture is distilled with stirring until all the methanol has been removed and the sodium salt of the urea deposits out of the solution. At this point the solution is cooled to 40° C. and a total of 169.5 parts by weight of N-methyl-N-phenyl carbamyl chloride is added gradually in a period of one hour. The entire mixture is stirred at 40°–50° C. until the reaction is no longer alkaline then cooled and filtered. Toluene is removed from the filtrate under reduced pressure. The solvent-free residue is combined with the toluene insoluble solids and both slurried in 1000 parts by weight of cold water to remove the sodium chloride by-product. Essentially pure 1,1,3,5-tetramethyl-5-phenyl biuret is obtained as the water insoluble residue.

This substituted biuret is then formulated into the following oil-water dispersible powder herbicidal composition by mixing the ingredients and grinding the mix to give a composition having an average particle size less than about 50 microns.

| Example | Urea and parts by weight | Aryl isocyanate and parts by weight | Product obtained |
|---|---|---|---|
| 2 | 1,3-dimethylurea (88.0) | P-tolylisocyanate (133) | 1,3-dimethyl-5-p-tolybiuret. |
| 3 | do | P-sec butyl phenylisocyanate (175) | 1,3-dimethyl-5-p-sec-butyl phenyl biuret. |
| 4 | do | P-cumyl isocyanate (161) | 1,3-dimethyl-5-p-cumyl biuret. |
| 5 | 1,1-dimethylurea (88) | m-Tolylisocyanate (133) | 1,1-dimethyl-5-m-tolylbiuret. |
| 6 | 1,3-dimethylurea (88) | m-Chlorophenyl isocyanate (153.5) | 1,3-dimethyl-5-m-chloro phenyl biuret. |
| 7 | do | 3-chloro-p-tolyl isocyanate (167.5) | 1,3-dimethyl-5-(m-chloro-p-tolyl) biuret. |
| 8 | do | 3-nitro-4-chlorophenylisocyanate (198.5) | 1,3-dimethyl-5-(3-nitro-4-chlorophenyl) biuret. |
| 9 | do | P-chlorophenylisocyanate (153.5) | 1,3-dimethyl-5-(p-chlorophenyl) biuret. |
| 10 | do | 3,4-dichlorophenylisocyanate (188) | 1,3-dimethyl-5-(3,4,-dichloro phenyl) biuret. |
| 11 | do | 2,4,5-trichlorophenylisocyanate (222.5) | 1,3-dimethyl-5-(2,4,5-trichloro phenyl) biuret. |
| 12 | do | 3-chloro-4-cumul isocyanate (195.5) | 1,3-dimethyl-5-(3-chloro-4-cumyl) biuret. |
| 13 | do | P-bromophenylisocyanate (198) | 1,3-dimethyl-5-(p-bromophenyl) biuret. |
| 14 | 1,3-dimethylurea (88.0) | P-fluorophenylisocyanate (137) | 1,3-dimethyl-5-(p-fluorophenyl) biuret. |
| 15 | do | 2,4-dichlorophenylisocyanate (188) | 1,3-dimethyl-5-(2,4-dichlorophenyl) biuret. |

| | Percent |
|---|---|
| 1,1,3,5 tetramethyl-5-phenyl biuret | 75 |
| Polyoxyethylene sorbitan esters of mixed fatty and rosin acids | 3 |
| Attapulgite clay | 22 |

*Example 19*

1,1,5,5-tetramethyl-3-(3,4-dichlorophenyl) biuret is prepared in accordance with the procedure of Example 18 by substituting, for the trimethyl urea and N-methyl-N-phenyl carbamyl chloride, 164 parts of 1-(3,4-dichlorophenyl)-3,3-dimethylurea and
108 parts of dimethylcarbamyl chloride.

*Example 20*

This example illustrates the use of these biurets as post-emergence crop herbicides. The listed wettable powder formulation is prepared in accordance with the method set forth in Example 1.

| | Percent |
|---|---|
| 1,1-dimethyl-5-phenylbiuret | 80 |
| Alkyl naphthalene sulfonic acid, sodium salt | 1.5 |
| Methyl cellulose low viscosity | 0.25 |
| Attapulgite clay | 18.25 |

This composition is extended with water to form a 1% active formulation. When used at a rate of 2.0 lb./A. of active as a directed spray (directed at the base of the plant) for sugar cane at time of last lay-by, just after the last cultivation, excellent weed control is obtained with minimum crop damage.

*Example 21*

A granular composition is prepared having the following ingredients:

| | Percent |
|---|---|
| 1,1-dimethyl-5-phenylbiuret | 2 |
| Corn starch | 1 |
| Low viscosity polyvinyl alcohol | 1.3 |
| Granular 8–15 mesh attapulgite | 95.7 |

The above composition is prepared by first swelling the corn starch in hot water, then dissolving the polyvinyl alcohol in the same mixture, followed by suspension of the micropulverized biuret in the starch-PVA. The aqueous slurry is then sprayed upon the attapulgite while tumbling the latter. Upon drying, the granules are found to be covered with a firmly adherent layer of the active material.

This formulation is applied by hand methods at rates of 25 pounds of biuret per acre for control of both annual and perennial broadleaf and grass weeds growing around signposts, telephone poles, highway and guard rails. Excellent weed control is obtained.

*Example 22*

An aqueous suspension is prepared having the following ingredients:

| | Percent |
|---|---|
| 1,1,5,5-tetramethyl-3-(3,4-dichlorophenyl) biuret | 28.0 |
| Sodium lignin sulfonate | 5.0 |
| Hydrated attapulgite | 2.0 |
| Sodium pentachlorophenate | 0.5 |
| Water | 64.5 |

The above composition is blended, then pebble milled or sand milled until the biuret component is substantially all below 5 microns in particle size. This formulation is applied as a directed post-emergence spray, at the rate of 1 to 2 pounds of biuret per acre, in 30 gallons of water, for control of existing tender annual weeds. Pigweed, velvet leaf, morning glory, chickweed, crabgrass, foxtail and cheat are controlled in garden peas, corn, sugar cane and asparagus without injury to the economic crop.

The biuret of this example is used for general overall weed control at rates of 20 to 30 pounds of biuret per acre in 100 gallons of water. Excellent control is obtained of quackgrass, seedling Johnson grass, broomsedge, foxtail, horseweed, mustard and flower-of-an-hour.

*Example 23*

An oil suspension is prepared having the following ingredients:

| | Percent |
|---|---|
| 1,3-dimethyl-5-(p-chlorophenyl) biuret | 25 |
| Alkyl aryl polyether alcohol | 8 |
| Diesel oil | 67 |

The above composition is prepared by mixing the components and grinding in a paint mill, pebble mill or sand mill until the biuret is substantially all below 10 microns in particle size. The resulting suspension can be emulsified in water or extended with weed oils for application.

At rates of 20 to 30 pounds of the biuret component per acre, in 80 gallons of Lion Herbicidal Oil No. 6, excellent weed control is obtained on mainline and sidings of railroad rights-of-way, for such weed species as quackgrass, velvet leaf, ragweed, pigweed, bachelor's buttons, crabgrass and foxtail.

*Example 24*

Herbicidal pellets are prepared having the following ingredients:

| | Percent |
|---|---|
| 1,3-dimethyl-5-(3-chloro-4-cumyl) biuret | 25 |
| Anhydrous sodium sulfate | 10 |
| Non-swelling calcium-magnesium bentonite | 65 |

The above composition is blended and micropulverized, then moistened with 18–25% water and extruded through 1/8 inch die holes, cutting the extrusions at the die face into 1/8 inch pellets. The pellets are then dried.

This formulation is applied at the rate of 30 pounds of herbicidally active biuret component per acre for the control of annual and perennial weeds growing around oil tanks. Excellent control is obtained of peppergrass, ragweed, flower-of-an-hour, crabgrass, and bluegrass.

In addition to the formulations above specifically given, the following biurets can also be used in the same ways to make herbicidal compositions of the invention. These herbicidal compositions can be applied to weed infested areas in accordance with the above examples to give excellent weed control:

1,5-dimethyl-3-phenyl biuret
1-methyl-3-phenyl biuret
1,1-dimethyl-3-phenyl biuret

The invention claimed is:

A method for the control of undesirable plant growth which comprises applying to the locus to be protected, in an amount sufficient to exert a herbicidal action, a substituted biuret represented by the formula:

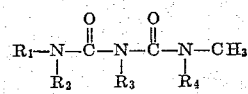

where $R_1$ and $R_3$ are selected from the group consisting of hydrogen, methyl and aryl represented by:

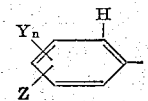

where Y is selected from the group consisting of hydrogen and halogen, $n$ is a positive whole number less than 4 and Z is selected from the group consisting of hydrogen, nitro, and alkyl of 1 through 4 carbon atoms, with the proviso that one and only one of $R_1$ and $R_3$ is aryl; and $R_2$ and $R_4$ are selected from the group consisting of hydrogen and methyl.

References Cited by the Examiner

UNITED STATES PATENTS

| | | | |
|---|---|---|---|
| 2,655,447 | 10/53 | Todd | 71—2.6 |
| 2,663,729 | 12/53 | Searle et al. | 71—2.6 |
| 2,668,758 | 2/54 | Roos et al. | 71—2.7 |
| 2,704,244 | 3/55 | Goodhue et al. | 71—2.3 |
| 2,723,192 | 11/55 | Todd | 71—2.6 |
| 2,723,193 | 11/55 | Todd | 71—2.6 |
| 2,762,695 | 9/56 | Gerjovich | 71—2.6 |
| 2,780,535 | 2/57 | Snyder | 71—2.6 |
| 2,849,306 | 8/58 | Searle | 71—2.6 |

FOREIGN PATENTS

| | | |
|---|---|---|
| 819,853 | 9/59 | Great Britain. |

OTHER REFERENCES

Davis et al.: "J. Am. Chem. Soc.," vol. 58, page 1803, 1936.

De France et al.: "Chemical Abstracts," vol. 41, col. 6010(c), 1947.

Hass et al.: "Chemical Abstracts," vol. 48, 1954, col. 11708(c).

Jones: "Science," Sept. 24, 1954, pages 499 and 500.

Munz et al., German application, 1,032,595, printed June 19, 1958.

Ogota: "Chemical Abstracts," vol. 49, 1955, col. 10,567(i).

Thompson et al.: "Botanical Gazette," vol. 107, pp. 475–507 (page 505 particularly relied on) 1946.

LEWIS GOTTS, *Primary Examiner.*

M. A. BRINDISI, *Examiner.*